United States Patent
Piirainen

(12) 
(10) Patent No.: US 6,526,102 B1
(45) Date of Patent: Feb. 25, 2003

(54) METHOD OF OPTIMIZING TRANSMISSION, AND TRANSMITTER

(75) Inventor: Olli Piirainen, Oulu (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/284,121

(22) PCT Filed: Aug. 13, 1998

(86) PCT No.: PCT/FI98/00625
§ 371 (c)(1),
(2), (4) Date: Apr. 28, 1999

(87) PCT Pub. No.: WO99/09676
PCT Pub. Date: Feb. 25, 1999

(30) Foreign Application Priority Data

Aug. 14, 1997 (FI) .................................................. 973337

(51) Int. Cl.$^7$ ......................... H04K 1/02; H04L 25/03; H04L 25/49
(52) U.S. Cl. ...................... 375/297; 375/296; 375/146; 455/561
(58) Field of Search ................................ 375/296, 297, 375/146, 135; 455/561, 562; 342/383

(56) References Cited

U.S. PATENT DOCUMENTS

| | | | |
|---|---|---|---|
| 4,850,037 A | 7/1989 | Bochmann | 455/276 |
| 5,191,594 A | 3/1993 | Argo et al. | 375/1 |
| 5,752,168 A | 5/1998 | Monot et al. | 455/67.3 |
| 5,999,862 A * | 12/1999 | Scheibel | 701/1 |
| 6,018,644 A * | 1/2000 | Minarik | 455/82 |
| 6,181,919 B1 * | 1/2001 | Ozluturk | 455/69 |
| 6,252,548 B1 * | 6/2001 | Jeon | 342/383 |
| 6,256,502 B1 * | 7/2001 | Santa et al. | 455/442 |

FOREIGN PATENT DOCUMENTS

| | | |
|---|---|---|
| CA | 2211619 | 6/1997 |
| EP | 0184383 | 6/1986 |
| EP | 0263357 | 4/1988 |
| EP | 0735702 | 10/1996 |
| EP | 0806844 | 11/1997 |
| EP | 0807989 | 11/1997 |
| JP | 09219615 | 8/1997 |
| WO | WO 97/08841 | 3/1997 |

* cited by examiner

*Primary Examiner*—Phuong Phu
(74) *Attorney, Agent, or Firm*—Pillsbury Winthrop LLP

(57) ABSTRACT

The invention relates to a method of optimizing transmission, and a transmitter receiving digital signals, in which the transmitter is used in a radio system to optimally transmit the signals. The transmitter includes modulation means arranged to modulate the received signals, and converter means for converting the digital signal into an analog signal before signal transmission. The position of the signal received by the converter means within the dynamic range of the converter means affects optimality of the signal obtained from the conversion. The transmitter further include means for generating weighting coefficients, and means for weighting each modulated signal by a specific weighting coefficient so as to set the mutual power levels of the signals into predetermined relations and to optimally dispose the signals within the dynamic range of the converter means. In addition, the transmitter includes means for combining the weighted signals, after which the converter means converts the combined signal into an analog signal, and means for scaling the signal converted into the analog signal into a predetermined power level.

35 Claims, 1 Drawing Sheet

METHOD OF OPTIMIZING TRANSMISSION, AND TRANSMITTER

FIELD OF THE INVENTION

The invention relates to a method of optimizing transmission, which method is used at a transmitter receiving several digital signals that are modulated, which transmitter comprises converter means converting a signal into an analog signal before signal transmission, and in which method the position of the signal to be converted within the dynamic range of the converter means affects optimality of the signal obtained from the conversion.

The invention also relates to a transmitter receiving digital signals, which transmitter is used in a radio system to optimally transmit signals, the transmitter comprising modulation means arranged to modulate the received signals, and converter means converting the digital signal into an analog signal before signal transmission, the position of the signal received by the converter means within the dynamic range of the converter means affecting optimality of the signal obtained from the conversion.

DESCRIPTION OF THE PRIOR ART

In prior art radio systems, such as GSM radio systems, a signal coming from the direction of a fixed network usually propagates to a base station via a mobile exchange and a base station controller. The base station operating as a transmitter receives a digital signal coming from the direction of a fixed PSTN network and forwards the signal to a subscriber terminal. Depending on the radio system used, the base station also has information on directing the signal to be transmitted into the desired timeslot, for example. In addition, the base station has information on the power level at which the signal is transmitted, for example. Generally, the base station transmits signals to subscriber terminals at different power levels according to instructions obtainable from the radio system. When transmitting the signal, the base station operates as a transmitter.

The base station performs various types of codings, such as channel coding, to data comprising the received signal, after which digital signals coming from different channels are modulated. After the modulation, the signals are converted into analog signals, after which the signals are combined in the analog parts of the transmitter. Next, the combined signal is amplified and transmitted onto a radio path.

The spectrum of a signal transmitted by a prior art transmitter, such as a base station, comprises various types of interference caused by the conversion of digital signals into analog signals and by the combining of the signals. The base station receives signals whose frequencies and power levels are usually very different. Problems are particularly caused by signals coming to a DIA converter at different power levels, since, in prior art solutions, constant optimal utilization of the dynamic range of the converter is impossible. In addition, converters available at the moment cannot tolerate interference in the signal well enough. After the combination, the signals with different power levels also bring about interference, particularly to adjacent channels.

EP 735 702 discloses a signal reception method employing the weighting of the received signal. However, the method disclosed in the prior art differs from the one disclosed in the application, for example, in that in the method disclosed in the prior art, signals are not set into a correct mutual relation after they are combined and converted into analog signals. In addition, the method disclosed in the prior art is used in signal reception, whereas the one disclosed in the application is used at a transmitter.

EP 263 357 discloses a reception method in which signals are received with several antennas. The received signals are combined by using weighting coefficients. The method disclosed in the prior art is used in signal reception, whereas the one disclosed in the application is used at a transmitter. Furthermore, in the method disclosed in the prior art, the manner of weighting the signal differs from the one in the method disclosed in the application.

EP 807 988 discloses a method of generating weighting coefficients. The disclosed method differs from the one disclosed in the application in that in the method disclosed in the prior art, no reference is made to combining the weighted signal and converting the combined signal into an analog signal, for example.

The method disclosed in EP 806 844 differs from the one disclosed in the application in that it is used at a receiver. The method disclosed in the prior art uses weighting coefficients, but the weighting coefficients are feed-back-controlled.

JP 921 9615 discloses a transceiver structure using a reference signal for calculating weighting coefficients. In addition, adaptive antenna arrays are used at the transceiver. It is not necessary to use antenna arrays in the solution of the application. In addition, a reference signal as disclosed in the prior art is not used in the method disclosed in the application.

BRIEF DESCRIPTION OF THE INVENTION

An object of the invention is to provide a method and transmitter to solve the above problems. This is achieved by a method of the type presented in the introduction, which is characterized in that each modulated signal is weighted by a specific weighting coefficient so as to set the mutual power levels of the signals into predetermined relations and to optimally dispose the signals within the dynamic range of the converter means, the signals are combined after the weighting, and the combined signal is converted into an analog signal, after which the combined signal is scaled to a predetermined power level.

The transmitter is characterized in that it comprises means for generating weighting coefficients, means for weighting each modulated signal by a specific weighting coefficient so as to set the mutual power levels of the signals into predetermined relations and to optimally dispose the signals within the dynamic range of the converter means, means for combining the weighted signals, after which the means convert the combined signal into an analog signal, and means for scaling the signal converted into the analog signal to a predetermined power level.

The preferred embodiments of the invention are disclosed in the dependent claims.

The invention is based on the idea that a signal coming to a DIA converter is so processed that after the processing, the signal utilizes the dynamic range of the converter as optimally as possible. In the solution of the invention, the dynamics the D/A converter is optimized when several digitally modulated signals are combined. This is done in two phases. In a first phase, the power levels of the signals are set into a correct relation with one another in such a way that the dynamics of the converter becomes optimally utilized. The modulated signals are combined, after which the combined signal is set to the absolutely correct power level.

The method and transmitter of the invention provide many advantages. The method enables conversion of digital signals at different power levels into analog signals in such a way that a signal coming to the transmitter even at a very low power level is converted by optimally utilizing the dynamic range of a converter. This is implemented in such a way that each received signal is weighted by a weighting coefficient matched to the signal, whereby the word length of the signal can be matched to the maximum word length of the converter, and problems caused by different signal power levels are thus solved. The transmitter can be implemented with fewer analog parts or by combining analog parts, whereby the transmitter can be implemented at a lower cost. In addition, the transmitter tolerates interference much better than previously implemented transmitters. Furthermore, the transmitter of the invention consumes less power than prior art transmitters, since the number of analog parts consuming power can be reduced, for example.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

Figure 1:
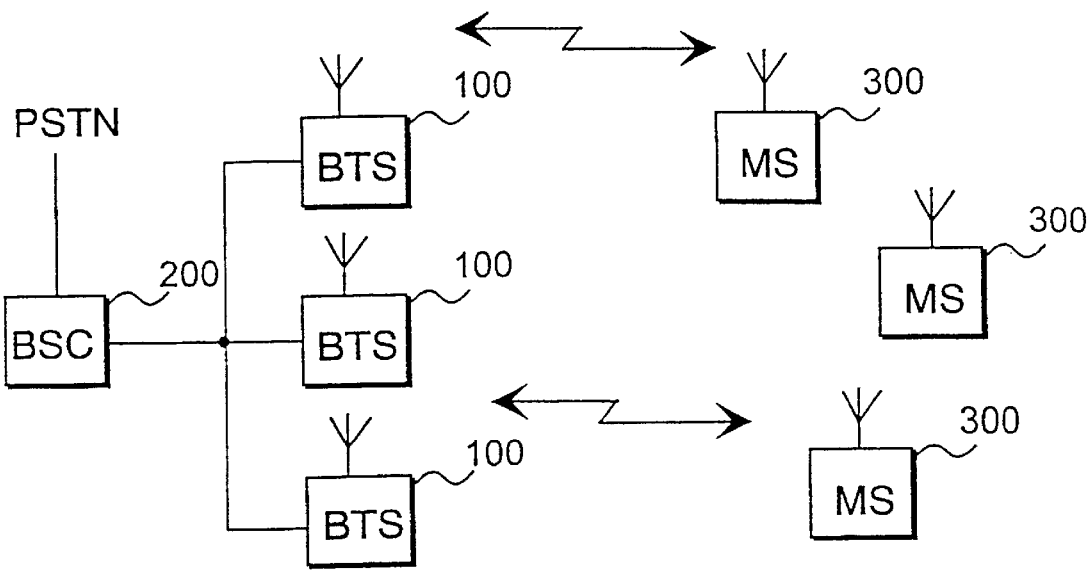
FIG. 1 shows a radio system comprising a number of transmitters that use the method of the invention, FIG. 2. shows the transmitter of the invention.

FIG. 1 shows a radio system comprising a number of base stations 100 and a base station controller 200. Furthermore, the radio system comprises a number of subscriber terminals 300. The base stations 100 are connected to the base station controller 200 via a fixed transmission network, for example. The base stations 100 receive a digital signal coming from the PSTN (Public Switched Telephone Network) and being converted into an analog signal that is forwarded via a radio path to the subscriber terminals 300. In other words, the base stations 100 operate as transceivers.

Figure 2:
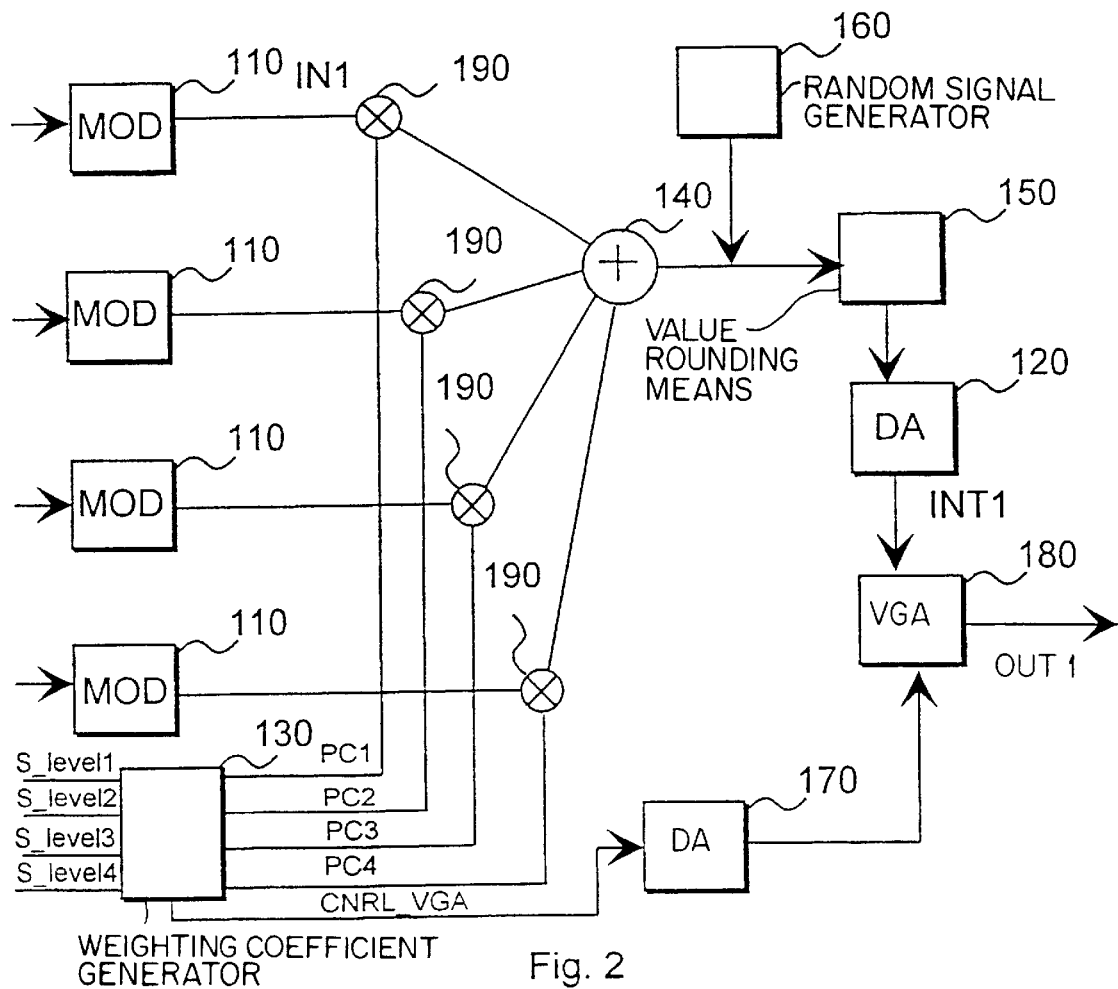

FIG. 2 shows a transmitter that can be used in the radio system presented in FIG. 1. In practice, the transmitter is located in the base station 100. For its part, the transmitter generates a signal to be transmitted to the subscriber terminal 300. The transmitter comprises a number of means 110, and means 130. In addition, the transmitter comprises means 190 receiving a signal from the means 110, 130. The means 110 receive a digital signal coming from the PSTN, for example, and modulate the received signal preferably by a digital modulation method. The transmitter according to the figure uses the DDS method (Direct Digital Synthesis) by means of which the modulated signal is brought to the desired frequency.

The means 110 modulate several different signals, and each signal establishes different connections to the subscriber terminals 300. The connections can be calls, for example. Each modulated signal has its specific power level, indicated by S_level in the figure. The means 130 generate, on the basis of the power levels of the signals received by the transmitter, weighting coefficients ($PC_i$) that are applied to the means 190. The transmitter according to the figure receives four signals, and for each of them, the means 130 generate a weighting coefficient indicated by $PC_1 \ldots PC_4$. In practice, the power level of the signal is proportional to the amplitude of the signal, for example.

The transmitter also comprises means 140 that is connected to the means 190 and combines signals coming from the means 190. The transmitter further comprises means 170, 180, and converter means 120. The converter means 120 receive the signal that is combined by the means 140 and convert it into an analog signal. Next, the analog signal is applied to the means 180 that change the power level of the received signal. Besides weighting coefficients, the means 130 also generate, on the basis of the power levels of the signals received by the means 110, scaling factors (CTRL_VGA) that are converted into an analog signal in the means 170. In practice, the means 170 are implemented by a D/A converter. The analog signal generated by the means 170 is applied to the means 180. The means 180 change, on the basis of the signal coming from the means 170, the power level of the signal coming from the converter means 120. In other words, the signal coming from the means 170 is used as a control signal. In practice, the means 180 are implemented by a VGA amplifier (Variable Gain Amplifier), for example, whose amplification changes in connection with the change of the control signal.

In practice, the converter means 120 are implemented by a D/A converter. An optimal word length having, for example, the same length as the maximum word length accepted by the converter means 120 can be selected for the signal coming to the converter means 120 via the means 140. In some cases, the conversion of a signal in the converter means 120 can be optimally carried out when the converter means 120 receive a signal substantially equivalent to the width of the dynamic range of the converter means, for example.

The means 130 generate weighting coefficients by using signals received by the transmitter. The means 190 weight each modulated signal by a weighting coefficient proportional to the received signals. The means 190, which are operationally connected to the means 110, 130, generate, from the modulated signal and from the weighting coefficient proportional to the modulated signal, a result that substantially corresponds to multiplication. The weighting distributes the modulated signal optimally over the dynamic range of the converter means 120. In other words, as regards the converter 120, the signals are disposed within the optimal range. The means 130 can optimally weight the signal coming to the converter means 120 in such a way that the word length of the digital signal increases towards the maximum word length accepted by the converter means 120, for example.

The means 190 weight each modulated signal by a specific weighting coefficient so as to set the mutual power levels of the signals into predetermined relations. In this case, a predetermined relation refers to a relation or a ratio between the signals, the ratio being obtained from the relations of the mutual power levels predetermined for the signal. In the weighting, each signal is further optimally disposed within the dynamic range of the converter means 120. In the weighting, the means 190 set the power levels of the signals into predetermined relations according to the specific power level in each signal during the modulation. The power levels of the signals coming from the means 110 to the means 190 are the same. The means 110 modulate the signals to the same power level in such a way that the power levels of the signals are at the same level before they are weighed. In the weighting, the means 190 change the mutual relation of the signal power levels compared with the relations of the power levels of the received signals.

Let us assume that the width of the dynamic range of the converter means 120 is 13 bits. Let us also assume that a signal having a word length of 14 bits is obtained from the output of the means 110. In this case, if the signal obtained from the output of the means 110 is weighted by a weighting coefficient proportional to the power level (S_level) of the signal, a signal word length of 10 bits may then be obtained at the input of the converter means 120. In the above mentioned situation, the means 130 change the weighting coefficient (PC$_i$) associated with the signal to 0.5, whereby the word length of the signal coming from the means 110 may be changed to 13 bits. In the above-described situation, it is also assumed that the full scale of the converter means 120 corresponds to the optimal range. Next, the signal obtained from the output of the converter means 120 is again weighted by a signal (CTRL_VGA) that is obtained from the means 130 and generates a scaling factor. In the above described situation, the means 130 generate a scaling factor whose value is 0.125.

The means 130 generate a weighting coefficient in such a way that the means 130 measure the power level of the signal received by the transmitter, for example. The means can also obtain information on the magnitude of the power level in some other manner. When the means 130 obtain information on the magnitude of the power level of the signal, the means 130 multiply or, similarly thereto, weight the maximum word length accepted by the converter means 120 by the measured power level value. On the basis of the above mentioned calculation, the obtained multiplication result is divided, similarly to the multiplication, by the sum of the power levels of the modulated signals. Instead of dividing, the multiplication result can also be weighed by the inverse of the sum of the modulated signal power levels. In other words, the transmitter of the invention enables more efficient utilization of the capacity of the converter means 120. The means 130 generate weighting coefficients for each signal received by the transmitter by substantially using the following formula (1), or an equivalent formula:

$$PC_i = S\_Level_i * \left( \frac{Max\_DAC\_Scale}{\sum_j S\_Level_j} \right), \quad (1)$$

where
PC$_i$ stands for the weighting coefficient,
S_Level$_i$ stands for the power level of the received signal,
Max_DAC_Scale is a constant defining the maximum of the conversion version range of the converter means, $$\sum_j S\_Level_j$$

stands for the sum of the power levels of the signals.

The means 130 also generate scaling factors by using the signals received by the transmitter. The scaling factors are applied to the means 180 via the means 170. Next, the means 180 scale, by using the scaling factors, the signal converted into the analog signal to a predetermined power level or amplitude, defining signal intensity. The means 180 scale the signals that form the combined signal to the desired power level by the same scaling factor. In practice, the means 180 are implemented by an amplifier. The amplifier amplifies or attenuates, on the basis of the scaling factor generated by the means 130, the analog signal coming from the means 120. The means 180 dynamically adjust the absolute power level of the signal to the desired level.

The means 130 sum the power levels of the signals received by the transmitter, after which the means 130 divide the summing result by the maximum word length value accepted by the converter means 120. Instead of dividing, the summing result can be weighted, i.e. multiplied by the inverse of the maximum word length value accepted by the converter means 120. The means 130 substantially generate the scaling factors by the following formula (2), or an equivalent formula:.

$$CTRL\_VGA = \left( \frac{\sum_j S\_Level_j}{Max\_DAC\_Scale} \right), \quad (2)$$

where
PC$_i$ stands for the weighting coefficient,
S_Level$_i$ stands for the power level of the received signal,
Max_DAC_Scale is a constant defining the maximum of the conversion range of the converter means, $$\sum_j S\_Level_j$$

stands for the sum of the power levels of the signals,
CTRL_VGA stands for the scaling factor.

In the following, the solution of the invention is described concerning one modulated signal. Let a signal obtained from the means 110 be IN$_1$, for example. Also, let a signal obtained from the output of the means 120 be INT$_1$, for example. The means 130 generate a weighting coefficient PC$_1$ that is proportional to the power level of the received signal and also to the IN$_1$ signal. In that case, after the operation executed by the means 190, the INT$_1$ signal is 30 obtained from the output of the means 190, and receives the value IN$_1$*PC$_1$. Let us also assume that the means 130 generate a scaling factor CTRL_VGA by means of which the weighted signal is restored to the desired power level. Let a signal obtained from the output of the means 180 be OUT$_1$. The OUT$_1$ signal can be presented in the following way:

$$OUT_1=INT_1*CTRL\_VGA=IN_1*PC_1*CTRL\_VGA=IN_1*S\_level_1.$$

In addition, the transmitter preferably comprises means 150, 160, disposed between the means 140 and 120. The means 150 round the value of the combined signal obtained from the means 140 to a proximate value. The means 160 add a random signal to the combined signal. Adding the random signal reduces interference in the signal before the signal is converted into an analog signal. Adding the random signal particularly reduces the effects of harmonic waves and quantization noise on the signal.

In the following, the method of the invention is described concerning the weighting coefficients (PC$_i$) that are used in the method and set the modulated signals into a mutually correct weighting relation. Let us assume that the power level, or the signal level, S_level_1 of a first signal is four. Let us also assume that the power level S_level_2 of a second signal is three. PC$_2$ then obtains the value ¾* PC$_1$, in which case the signals obtained from the output of the means 110 are correctly pre-weighted with regard to one another. Let us assume that after the modulation, the power levels of the signals obtained from the output of the means 110 are at level one. If the optimum number range of the converter means 120 is 14, PC$_1$ may then be eight, whereby PC$_2$ is six (PC$_1$+PC$_2$=14). The values weighted by the weighting coefficient $PC_i$ bear now a correct relation with regard to one another. After the combining, the modulated signals also bear a correct power level in relation to one another. However, the signals are not yet absolutely correctly weighted.

Let us assume that a symbol $MOD_1$ refers to a signal that is obtained from the output of the means 110 and weighted by the coefficient $PC_1$. Let us also assume that a symbol $MOD_2$ refers to a signal that is obtained from the output of the means 110 and weighted by the coefficient $PC_2$. Consequently, a signal having the value $PC_1*MOD_1 + PC_2*MOD_2$ is received from the output of the means 140. Next, the means 130 generate a scaling factor whose value is ½. The signal obtained from the output of the means 140 is multiplied by the scaling factor, whereby a signal whose value is $4*MOD_1 + 3*MOD_2$ is obtained as a result. The value of the signal is thus in accordance with the original S_level values, in other words, the signals are also absolutely correctly weighted.

Although the invention is described above with reference to the example according to the accompanying drawings, it is obvious that the invention is not restricted to it but it can be modified in a variety of ways within the scope of the inventive idea disclosed in the attached claims.

What is claimed is:

1. A method of optimizing transmission, which method is used at a transmitter receiving several digital signals that are modulated, which transmitter includes converter means converting a signal into an analog signal before signal transmission, and in which method the position of the signal to be converted within the dynamic range of the converter means affects optimality of the signal received by the conversion, the method comprising:
   weighting each modulated signal by a specific weighting coefficient so as to set the mutual power levels of the signals into predetermined relations and to optimally dispose the signals within the dynamic range of the converter means,
   combining the signals after weighting,
   converting the combined signal into an analog signal, and
   scaling the combined signal to a predetermined power level.

2. The method of claim 1, wherein, in the weighting, the power levels of the signals are set into predetermined relations according to a specific power level in each signal during the modulation.

3. The method of claim 1, wherein, in the weighting, the mutual relation of the power levels of the signals is changed.

4. The method of claim 1, wherein the signals are modulated to the same power level.

5. The method of claim 1, wherein the signals that form the combined signal are scaled to the desired power level by the same scaling factor.

6. The method of claim 5, wherein the scaling factor is generated by summing the power levels of the received signals, after which the summing result is divided or weighted by a maximum word length value accepted by the converter means.

7. The method of claim 1, wherein, in the scaling, a scaling factor converted into an analog signal is used.

8. The method of claim 1, wherein the scaling restores the power level of each signal that forms the combined signal to the power level in the signal before the signal modulation.

9. The method of claim 1, wherein, in the weighting, the word length of the signal is matched to the optimum word length of the converter means.

10. The method of claim 1, further comprising rounding the word length of the combined signal to a word length proximate thereto or to a pre-desired word length.

11. The method of claim 1, further comprising adding a random signal to the combined signal to reduce interference therein.

12. The method of claim 1, wherein the weighting coefficient is generated by measuring the power level of the received signal, after which the maximum signal word length value accepted by the converter means is multiplied or, similarly thereto, weighted by the measured power level value, and the received multiplication result is divided or weighted by the sum of the power levels of the modulated signals.

13. The method of claim 1, wherein the signals are modulated by a digital modulation method in which each signal is set to a specific frequency by a Direct Digital Synthesis method.

14. The method of claim 1, wherein each modulated signal is weighed by the specific weighting coefficient substantially obtained by the following formula:

$$PCi = S\_Level_i * \left( \frac{Max\_DAC\_Scale}{\sum_j S\_Level} \right),$$

where
   PCi stands for the weighting coefficient,
   $S\_Level_j$ stands for the power level of the received signal,
   Max_DAC_Scale is a constant defining the maximum of the conversion range of the converter means, $$\sum_j S\_Level_j$$

stands for the sum of the power levels of the signals.

15. The method of claim 1, wherein the analog signal is scaled by the scaling factor substantially obtained by the following formula:

$$CTRL\_VGA = \left( \frac{\sum_j S\_Level_j}{Max\_DAC\_Scale} \right),$$

where
   CTRL_VGA stands for the scaling factor,
   Max_DAC_Scale a constant defining the maximum of the conversion range of the converter means, and $$\sum_j S\_Level_j$$

stands for the sum of the power levels of the signals.

16. A transmitter receiving digital signals, which transmitter is used in a radio system to optimally transmit signals, the transmitter comprising modulation means arranged to modulate the received signals, and converter means for converting the digital signal into an analog signal before signal transmission, the position of the signal received by the converter means affecting optimality of the signal obtained from the conversion, the transmitter comprising:
   means for generating weighting coefficients,
   means for weighting each modulated signal by a specific weighting coefficient so as to set the mutual power levels of the signals into predetermined relations so as to optimally position the signals within the dynamic range of the converter means, means for combining the weighted signals, after which the converter means convert the combined signal into an analog signal, and means for scaling the signal converted into the analog signal to a predetermined power level.

17. The transmitter of claim 16, wherein the means for weighting set the power levels of the signals into predetermined relations according to the specific power level in the signal during the modulation.

18. The transmitter of claim 16, wherein the means for weighting change the mutual relation of the power levels of the signals.

19. The transmitter of claim 16, wherein the modulation means modulate the signals to the same power level in such a way that the power levels of the signals are at the same level before the weighting of the signals.

20. The transmitter of claim 16, wherein the scaling means scale the signals that form the combined signal to the desired power level by the same scaling factor.

21. The transmitter of claim 16, wherein the scaling means scale the signals that form the combined signal by the same scaling factor.

22. The transmitter of claim 16, wherein the scaling means set the signals that form the combined signal to the desired power level.

23. The transmitter of claim 16, wherein the weighting means match the signal coming to the converter means to the optimum word length of the converter means.

24. The transmitter of claim 16, wherein the weighting means form, from the modulated signal and from the weighting coefficient proportional to said modulated signal, a result that substantially corresponds to the multiplication.

25. The transmitter of claim 16, further comprising means for rounding the word length of the combined signal to a word length proximate thereto or to a pre-desired word length.

26. The transmitter of claim 16, further comprising means for adding a random signal to the combined signal to reduce interference in the combined signal before the conversion of the signal into an analog signal.

27. The transmitter of claim 16, wherein the means for generating weighting coefficients measure the power level of the signal received by the transmitter, after which the means multiply or, similarly thereto, weight the maximum word length value accepted by the converter means by the measured power level value, and the obtained multiplication result is divided or weighted by the sum of the power levels of the modulated signals to generate the weighting coefficient.

28. The transmitter of claim 16, wherein the means for generating the scaling factors generate scaling factors used in the scaling, the weighting means weight by the generated scaling factor, and the analog signal generated by the converter means to a predetermined power level.

29. The transmitter of claim 16, wherein the means for generating the weighting coefficient generate the scaling factor by summing the power levels of the signals received by the transmitter and dividing or weighting the summing result by the maximum signal word length value accepted by the converter means.

30. The transmitter of claim 16, furthering comprising scaling factor conversion means that are operationally connected to the means for generating weighting coefficients and that convert the scaling factor used in the scaling into an analog signal.

31. The transmitter of claim 16, wherein the scaling means are implemented by an amplifier amplifying or attenuating, on the basis of the scaling factor generated by the means for generating weighting coefficients, the analog signal coming from the converter means.

32. The transmitter of claim 16, wherein the modulation means modulate the signal by a digital modulation method.

33. The transmitter of claim 16, wherein during modulation, the modulating means sets each signal to its specific operating frequency by a Direct Digital Synthesis method.

34. The transmitter of claim 16, wherein the means for generating weighting coefficients generates the weighting coefficients for each signal received by the transmitter by substantially using the following formula:

$$PCi = S\_Level_j * \left( \frac{Max\_DAC\_Scale}{\sum_j S\_Level} \right),$$

where

PCi stands for the weighting coefficient,

S__Level$_j$ stands for the power level of the received signal, Max__DAC Scale is a constant defining the maximum of the conversion range of the converter means, and $$\sum_j S\_Level_j$$

stands for the sum of the power levels of the signals.

35. The transmitter of claim 16, wherein the means for generating weighting coefficients generates the scaling factors used in the scaling by substantially using the following formula:

$$CTRL\_VGA = \left( \frac{\sum_j S\_Level_j}{Max\_DAC\_Scale} \right),$$

where

CTRL__VGA stands for the scaling factor,

Max__DAC__Scale a constant defining the maximum of the conversion range of the converter means, and $$\sum_j S\_Level_j$$

stands for the sum of the power levels of the signals.

* * * * *